United States Patent
Hara et al.

(10) Patent No.: US 10,355,517 B2
(45) Date of Patent: Jul. 16, 2019

(54) STORAGE-BATTERY CONTROL DEVICE, STORAGE-BATTERY CHARGE/DISCHARGE SYSTEM, PHOTOVOLTAIC POWER GENERATION SYSTEM, AND STORAGE-BATTERY CONTROL METHOD

(71) Applicant: Mitsubishi Electric Corporation, Chiyoda-ku (JP)

(72) Inventors: Satoshi Hara, Chiyoda-ku (JP); Makiko Kise, Chiyoda-ku (JP); Shigeru Aihara, Chiyoda-ku (JP); Hiroto Nishiguchi, Chiyoda-ku (JP); Takahito Ida, Chiyoda-ku (JP); Tomoki Takegami, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 65 days.

(21) Appl. No.: 15/579,238

(22) PCT Filed: May 25, 2016

(86) PCT No.: PCT/JP2016/065423
§ 371 (c)(1),
(2) Date: Dec. 4, 2017

(87) PCT Pub. No.: WO2016/208319
PCT Pub. Date: Dec. 29, 2016

(65) Prior Publication Data
US 2018/0175660 A1    Jun. 21, 2018

(30) Foreign Application Priority Data
Jun. 22, 2015   (JP) ................................ 2015-124905

(51) Int. Cl.
*H02J 7/35*       (2006.01)
*H01M 10/44*    (2006.01)
(Continued)

(52) U.S. Cl.
CPC .............. *H02J 7/35* (2013.01); *H01M 10/44* (2013.01); *H01M 10/48* (2013.01); *H02J 3/32* (2013.01);
(Continued)

(58) Field of Classification Search
None
See application file for complete search history.

(56) References Cited

U.S. PATENT DOCUMENTS

| | | | |
|---|---|---|---|
| 2010/0174417 A1* | 7/2010 | Iida ..................... | H01M 10/425 700/292 |
| 2014/0012426 A1* | 1/2014 | Funakubo ................. | H02J 3/32 700/286 |
| 2018/0006335 A1* | 1/2018 | Fujita .................... | H01M 10/44 |

FOREIGN PATENT DOCUMENTS

| | | |
|---|---|---|
| JP | 2012-039725 A | 2/2012 |
| JP | 2012-095483 A | 5/2012 |

(Continued)

OTHER PUBLICATIONS

International Search Report dated Aug. 9, 2016 in PCT/JP2016/065423, filed on May 25, 2016.

*Primary Examiner* — Cassandra F Cox
(74) *Attorney, Agent, or Firm* — Oblon, McClelland, Maier & Neustadt, L.L.P.

(57) ABSTRACT

The present invention provides a storage-battery control device 1 capable of enhancing economical efficiency by controlling charge state of a storage battery 12 so that surplus power generated by photovoltaic generation can be entirely charged into the storage battery 12 even in a case where power cannot be sold to a system power supply 50. A storage-battery control device 1 according to the present invention includes a load-power prediction device 4 to predict load power, a PV-power prediction device 3 to predict generated power by photovoltaic power generation, (Continued)

and a system controller 2 to obtain a predicted charge amount that is calculated by subtracting the generated power amount being a summation of the generated power in a prediction segment 60 having a start point set at a predetermined time, from the load power amount being a summation of the load power in the prediction segment 60, and when the predicted charge amount is positive, to control the charge state of a storage battery 12 at the start point so that the predicted charge amount can be charged in the prediction segment 60, wherein an end point of the prediction segment 60 is a time at which the generated power by photovoltaic power generation is predicted to become equal to the load power after reaching the maximum value of the generated power.

20 Claims, 11 Drawing Sheets

(51) Int. Cl.
*H01M 10/48* (2006.01)
*H02J 3/38* (2006.01)
*H02J 7/00* (2006.01)
*H02J 3/32* (2006.01)
*H02S 40/32* (2014.01)
*H02S 40/38* (2014.01)
*H02J 3/00* (2006.01)

(52) U.S. Cl.
CPC .............. *H02J 3/383* (2013.01); *H02J 7/007* (2013.01); *H02J 7/0068* (2013.01); *H02J 2003/003* (2013.01); *H02S 40/32* (2014.12); *H02S 40/38* (2014.12); *Y02E 10/563* (2013.01); *Y02E 10/566* (2013.01); *Y02E 70/30* (2013.01)

(56) References Cited

FOREIGN PATENT DOCUMENTS

| | | | |
|---|---|---|---|
| JP | 2012-120419 | A | 6/2012 |
| JP | 2012-205385 | A | 10/2012 |
| JP | 2013-031295 | A | 2/2013 |
| JP | 2014-033539 | A | 2/2014 |
| JP | 2014-057505 | A | 3/2014 |
| JP | 5485392 | B2 | 5/2014 |
| JP | 2014-117003 | A | 6/2014 |
| JP | 2015-037352 | A | 2/2015 |

* cited by examiner

STORAGE-BATTERY CONTROL DEVICE, STORAGE-BATTERY CHARGE/DISCHARGE SYSTEM, PHOTOVOLTAIC POWER GENERATION SYSTEM, AND STORAGE-BATTERY CONTROL METHOD

TECHNICAL FIELD

The present invention relates to a storage-battery control device for controlling charge and discharge of a storage battery, a storage-battery charge/discharge system, a photovoltaic power generation system, and a storage-battery control method.

BACKGROUND ART

In a conventional storage-battery charge/discharge system, for example, a charging method for bringing a storage battery into a full charge state at the time of use is disclosed. The method includes an input step to input a starting date and time of using the power stored in the storage battery; a first charge control step to control charge of the storage battery by a control means so as to bring the charge amount of the storage battery to a first charge amount predetermined; and a second charge control step to control charge of the storage battery by the control means so as to complete the charge, at the starting date and time of use inputted in the input step, to a second charge amount (full charge) predetermined that is larger than the first charge amount (for example, refer to Patent Document 1).

PRIOR ART DOCUMENT

Patent Document

Patent Document 1: Japanese Patent Laid-Open Publication No. 2012-39725

SUMMARY OF THE INVENTION

Problems for Solving the Invention

In such a charging method, in a case where the amount of the power generated by photovoltaic power generation is larger than the load power required for a load, surplus power which is not consumed by the load out of the generated power is normally sold to a system power supply. However, problems arise in that, in a case when sale of power to the system power supply increases and the voltage of the system power supply becomes higher than a predetermined voltage (107 V or higher), the power cannot sometimes be sold to the system power supply, and further, when the storage battery is already in a full charge state, the surplus power cannot be even charged into the storage battery.

The present invention has been devised to solve the problems described above, and aims to provide a storage-battery control device, a storage-battery charge/discharge system, a photovoltaic power generation system, and a storage-battery control method that enable improvement in economic efficiency and that make it possible to control the charge state of the storage battery in order for the surplus power generated by photovoltaic power generation to be charged into the storage battery even in a case where the power cannot be sold to the system power supply.

Means for Solving the Problems

A storage-battery control device according to the present invention includes a load-power prediction device to predict load power required for a load, a PV-power prediction device to predict generated power by photovoltaic power generation, and a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery at the start point to be a full charge state by charging the storage battery, wherein an end point of the prediction segment is a time at which the generated power by photovoltaic power generation is predicted to become equal to the load power after reaching the maximum value of the generated power.

Further, a storage-battery control device according to the present invention includes a load-power prediction device to predict load power required for a load, a PV-power prediction device to predict generated power by photovoltaic power generation, and a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery by the start point to be close to a full charge state by charging the storage battery, wherein an end point of the prediction segment is a time at which the generated power by photovoltaic power generation is predicted to become equal to the load power after reaching the maximum value of the generated power.

A storage-battery charge/discharge system according to the present invention includes a load-power prediction device to predict load power required for a load, a PV-power prediction device to predict generated power by photovoltaic power generation, a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery at the start point to be a full charge state by charging the storage battery, wherein an end point of the prediction segment is a time at which the generated power by photovoltaic power generation is predicted to become equal to the load power after reaching the maximum value of the generated power, and a power storage device having the storage battery and a power conditioner for the storage battery to convert power to DC power or AC power in charging and discharging the storage battery.

Further, a storage-battery charge/discharge system according to the present invention includes a load-power prediction device to predict load power required for a load, a PV-power prediction device to predict generated power by photovoltaic power generation, a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery by the start point to be close to a full charge state by charging the storage battery, wherein an end point of the prediction segment is a time at which the generated power by photovoltaic power generation is predicted to become equal to the load power after reaching the maximum value of the generated power, and a power storage device having the storage battery and a power conditioner for the storage battery to convert power to DC power or AC power in charging and discharging the storage battery.

A photovoltaic power generation system according to the present invention includes a load-power prediction device to predict load power required for a load, a PV-power prediction device to predict generated power by photovoltaic power generation, a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery at the start point to be a full charge state by charging the storage battery, wherein an end point of the prediction segment is a time at which the generated power by photovoltaic power generation is predicted to become equal to the load power after reaching the maximum value of the generated power, a power storage device having the storage battery and a power conditioner for the storage battery to convert power to DC power or AC power in charging and discharging the storage battery, and a photovoltaic power generation device having a solar panel to perform photovoltaic power generation and a power conditioner for PV to convert the power generated by the solar panel from DC power to AC power.

Further, a photovoltaic power generation system according to the present invention includes a load-power prediction device to predict load power required for a load, a PV-power prediction device to predict generated power by photovoltaic power generation, a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery by the start point to be close to a full charge state by charging the storage battery, wherein an end point of the prediction segment is a time at which the generated power by photovoltaic power generation is predicted to become equal to the load power after reaching the maximum value of the generated power, a power storage device having the storage battery and a power conditioner for the storage battery to convert power to DC power or AC power in charging and discharging the storage battery, and a photovoltaic power generation device having a solar panel to perform photovoltaic power generation and a power conditioner for PV to convert the power generated by the solar panel from DC power to AC power.

A storage-battery control method according to the present invention includes predicting load power required for a load in a power prediction device, predicting generated power by photovoltaic power generation in a PV-power prediction device, and obtaining in a system controller a predicted charge amount that is calculated by subtracting the generated power amount being a summation of the generated power in a prediction segment having a start point set at a predetermined time, from the load power amount being a summation of the load power in the prediction segment, and when the predicted charge amount is positive, controlling a charge state of a storage battery at the start point so that the predicted charge amount can be charged in the prediction segment, and when the predicted charge amount is negative or zero, controlling the charge state of the storage battery at the start point to be a full charge state by charging the storage battery, wherein an end point of the prediction segment is a time at which the generated power by photovoltaic power generation is predicted to become equal to the load power after reaching the maximum value of the generated power.

Further, a storage-battery control method according to the present invention includes predicting load power required for a load in a load-power prediction device, predicting generated power by photovoltaic power generation in a PV-power prediction device, and obtaining in a system controller a predicted charge amount that is calculated by subtracting the generated power amount being a summation of the generated power in a prediction segment having a start point set at a predetermined time, from the load power amount being a summation of the load power in the prediction segment, and when the predicted charge amount is positive, controlling a charge state of a storage battery at the start point so that the predicted charge amount can be charged in the prediction segment, and when the predicted charge amount is negative or zero, controlling the charge state of the storage battery by the start point to be close to a full charge state by charging the storage battery, wherein an end point of the prediction segment is a time at which the generated power by photovoltaic power generation is predicted to become equal to the load power after reaching the maximum value of the generated power.

Effects of the Invention

By a storage-battery control device, a storage-battery charge/discharge system, a photovoltaic power generation system, and a storage-battery control method according to the present invention, a charge state of a storage battery is controlled so that surplus power generated by photovoltaic power generation can be charged into the storage battery even in a case where power cannot be sold to a system power supply, and thus economic efficiency can be improved.

EMBODIMENTS FOR CARRYING OUT THE INVENTION

Embodiment 1

A photovoltaic power generation system 100 according to Embodiment 1 of the present invention will be explained using FIGS. 1 to 9. In figures, elements designated as the same numerals are identical or equivalent ones, which is common to the entire sentences of the description.

In Embodiment 1 of the present invention, load power represents power required for a load 51 at a specific time, and generated power represents power generated at a specific time by a photovoltaic power generation device 101. Surplus power represents, in a case where the generated power is larger than the load power, a value obtained by subtracting the power required for the load 51 from the power generated by the photovoltaic power generation device 101 at a specific time, which takes a value larger than zero.

The load power amount is a summation (integrated value) of the load power in a specific segment and the generated power amount is a summation (integrated value) of the generated power in a specific segment. A predicted charge amount is obtained by subtracting the load power amount from the generated power amount, and a range for which the summation is made is predetermined. The detail will be described later.

Figure 1:
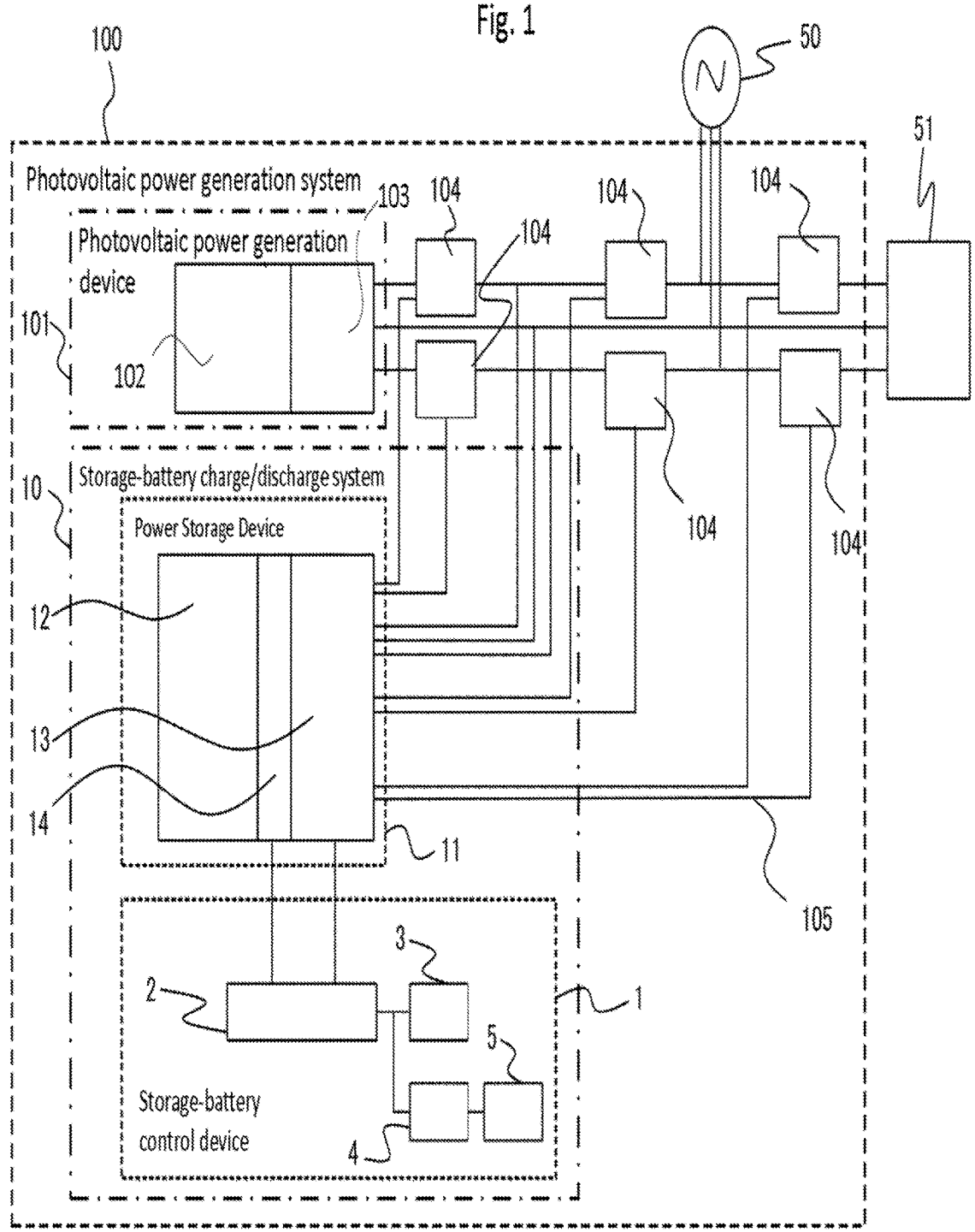
FIG. 1 is a block diagram showing the entire picture including a photovoltaic power generation system according to Embodiment 1 of the present invention.

FIG. 1 is a block diagram showing the entire picture including the photovoltaic power generation system 100 according to Embodiment 1 of the present invention. In FIG. 1, the photovoltaic power generation system 100, a system power supply 50, and a load 51 are shown.

The photovoltaic power generation system 100 is a system in which the generated power by photovoltaic power generation can be either used by the load 51 such as an electric appliance or charged into a storage battery 12. A specific configuration of the photovoltaic power generation system 100 will be described later. The photovoltaic power generation system 100 includes the photovoltaic power generation device 101, a storage-battery charge/discharge system 10, CT sensors 104, and cables 105.

The load 51 is, for example, an electric appliance installed in a home such as an air conditioner, a refrigerator, a television, and a light, and is driven either by the power generated by photovoltaic power generation or the power from the system power supply 50.

The system power supply 50 is a single-phase or a three-phase commercial power supply which supplies power to the photovoltaic power generation system 100. In a case where the generated power is larger than the load power and the storage battery 12 cannot be charged, normally, the sale of power to the system power supply 50 is possible.

The photovoltaic power generation device 101 includes a solar panel 102, which is a panel for photovoltaic power generation, and a power conditioner 103 for solar photovoltaics (PV), which is a converter to convert the power generated by the solar panel 102 from DC power to AC power.

The storage-battery charge/discharge system 10 includes a power storage device 11 and a storage-battery control device 1. The generated power converted in the power conditioner 103 for PV and outputted is mainly used either for the load 51 or for charging the storage battery 12 of the storage-battery charge/discharge system 10.

The CT sensors 104 are current transducers provided to figure out power values for the photovoltaic power generation device 101, the storage-battery charge/discharge system 10, and the load 51. The power is estimated from the current value measured by each of the CT sensors 104 under the assumption that the voltage is 100V. A power conditioner 13 for the storage battery, described later, estimates each of the power values and holds the estimated values. The power of the system power supply 50 is estimated from the power balance in each of the photovoltaic power generation device 101, the storage-battery charge/discharge system 10, and the load 51.

The cables 105 connect devices (the photovoltaic power generation device 101, the storage-battery charge/discharge system 10, the system power supply 50, and the load 51) including the CT sensors 104 with each other, through which current, control signals, etc., flow. Transmission and reception of the control signals are carried out via a communication device (not shown) in each of the devices that are connected each other with the cables 105.

The power storage device 11 includes the storage battery 12, a battery management unit (BMU) 14, and the power conditioner 13 for the storage battery. The storage-battery control device 1 includes a system controller 2, a PV-power prediction device 3, a load-power prediction device 4, and a learning device 5.

The storage battery 12 is charged either with the surplus power not consumed by the load 51 and remained in the power generated by photovoltaic power generation, or with the power from the system power supply 50 (especially, inexpensive power during late-night power time slot), and discharges the stored power when necessary. Note that the late-night power time slot is a time slot during which an inexpensive power rate is set to accelerate the use of power in the time slot with lower power demand such as in the night time. For example, generally in Japan, the period between 11 PM and 7 AM is set as the late-night power time slot. The storage battery 12 is a battery such as a lithium ion secondary battery, a nickel metal hydride battery, a lead storage battery, a sodium sulfur (NaS) battery, or a redox flow battery. The storage battery 12 may be an automotive storage battery besides a stationary storage battery and is not limited to these.

The BMU 14 has functions including a condition monitoring function of the storage battery 12 such as voltage measurement, current measurement, power measurement, and remaining capacity management, or a protection function of the storage battery 12 against overcharge, overdischarge, overvoltage, overcurrent, and abnormal temperature.

The power conditioner 13 for the storage battery has a function to convert power to DC power or AC power when the storage battery 12 is charged or discharged. To be more specific, when the storage battery 12 is charged, the power conditioner 13 for the storage battery converts AC power from the system power supply 50 or the photovoltaic power generation device 101 to DC power to charge the storage battery 12. When the storage battery 12 is discharged, the power conditioner 13 for the storage battery converts DC power from the storage battery 12 to AC power, and the converted AC power is used by the load 51 or sold to the system power supply 50. Surplus power is generated when the power generated by the photovoltaic power generation device 101 cannot be consumed in the load 51. The power conditioner 13 for the storage battery has a function to consume the surplus power in a resistor provided therein in the case where the surplus power cannot be sold to the system power supply 50 and it cannot be charged into the storage battery 12 owing to a full charge state thereof.

Further, the power conditioner 13 for the storage battery collects and manages information on voltage, current, and power in each of the devices, measured by, for example, the CT sensors 104. Also, the power conditioner 13 for the storage battery notifies the system controller 2 of the obtained information such as power in each of the devices via the BMU 14. In addition, the power conditioner 13 for the storage battery has a monitoring function to monitor input/output voltage or current in the storage battery 12 as well as a system-interconnection control function to control power for each of the devices (the storage battery 12, the photovoltaic power generation device 101, the system power supply 50, and the load 51).

The system controller 2 obtains, from the BMU 14, information on the storage battery 12 and power-related information on the power generated by photovoltaic power generation, the load power, and the system power supply 50. Also, the system controller 2 sends the control signals regarding the charge and discharge of the storage battery 12 to the power conditioner 13 for the storage battery and thereby controls the charge and discharge of the storage battery 12. The information on the storage battery 12 includes, for example, voltage, a charge state and temperature of the storage battery 12. The system controller 2 controls charge and discharge of the storage battery 12 according to the prediction on power obtained from the PV-power prediction device 3 and the load-power prediction device 4.

The PV-power prediction device 3 is a device to calculate the amount of solar radiation onto the solar panel 102 during a day for prediction (hereinafter, referred to as prediction day), thereby to predict a pattern of the generated power by photovoltaic power generation during a day. For example, the PV-power prediction device 3 calculates the extraterrestrial solar radiation on the basis of the information on the prediction day, the latitude and longitude of the installation location, and calculates the amount of solar radiation onto the solar panel 102 during the prediction day in consideration of the weather information (conditions provided hourly such as sunny, cloudy, and rainy conditions, precipitation probability, snowfall, humidity, and atmospheric temperature) on the prediction day, and thereby predicts generated power by photovoltaic power generation during the day. The weather information may be obtained, for example, from the Internet. The method to obtain it, however, is not limited thereto.

The load-power prediction device 4 has pattern data of the load power to be required for the load 51 depending on the date or the day of the week and thereby predicts a pattern of the load power based on the prediction day. In the beginning where pattern data of the load power reflecting a user's usage state is not available, for example, a typical power usage pattern (an average value for households, etc.) observed in the installation area is used.

The learning device 5 stores in a memory, etc. the load power predicted by the load-power prediction device 4 and the power actually required for the load 51, and corrects, on the basis of the user's usage state, the load power predicted by the load-power prediction device 4 in accordance with the date, the day of the week, and the weather, etc. The load-power prediction device 4 predicts the load power by using the pattern data corrected in accordance with the user's usage state.

Figure 2:
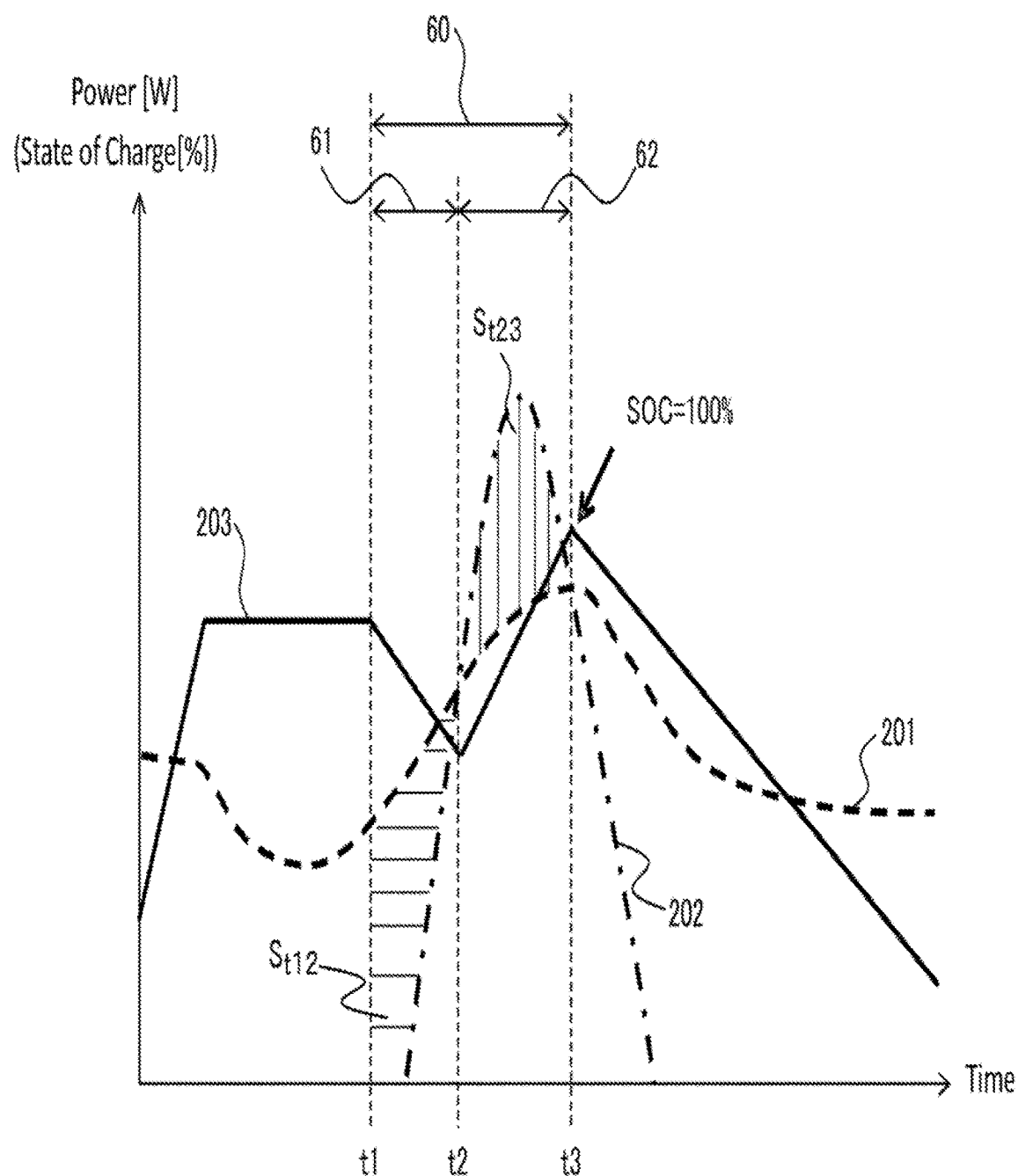
FIG. 2 is a conceptual graph showing fluctuations of load power, generated power, and a charge state of a storage battery according to Embodiment 1 of the present invention.

FIG. 2 is a conceptual graph showing fluctuations of the load power, the generated power, and the charge state of storage battery 12 according to Embodiment 1 of the present invention. In FIG. 2, the load power is denoted by the broken line 201, the generated power by the photovoltaic power generation device 101 is denoted by the dashed and dotted line 202, and the charge state of the storage battery 12 is denoted by the solid line 203.

The charge state of the storage battery 12 is denoted as SOC (State Of Charge) [%], where 100% means a full charge state. Note here that, the unit of the load power and the generated power is watt [W] and the unit of the charge state of the storage battery 12 is percent [%], which do not allow direct comparison in magnitude between them. However, to help visually grasp the changes of the load power and the generated power, and the SOC change over time, they are superimposed in FIG. 2. In FIG. 2, the vertical axis indicates the levels of the load power and the generated power as well as, as noted in the parentheses, the charge state of the storage battery 12.

In general, photovoltaic power generation starts at sunrise, peaks in the daytime, and ends at sunset, and therefore the generated power forms a convex-shaped graph. FIG. 2 shows their fluctuations over 24 hours.

The time t1 to t3 is a prediction segment 60 predetermined by the system controller 2, where the time t1 is the start point of the prediction segment 60 and the time t3 is the end point of the prediction segment 60. Here, the time t1 to t2 is called a first segment 61 and the time t2 to t3 is called a second segment 62.

The time t1 is a predetermined time (for example, 7 AM) to end the late-night power time slot offering an inexpensive power rate. Regarding the time t1, the storage battery 12 is charged up to a predetermined charge state using the system power supply 50 until the time t1, and it starts discharging from the predetermined charge state from the time t1. How to determine the predetermined charge state at the time t1 will be described later.

The time t2 is a time predicted by the system controller 2 at which the generated power by photovoltaic power generation, increasing with time from the time t1, becomes equal to the load power.

The time t3 is a time predicted by the system controller 2 at which the generated power by photovoltaic power generation, decreasing after passing its peak, becomes equal to the load power.

$S_{t12}$ is an amount of power that is calculated by subtracting a predicted amount of power to be generated by photovoltaic power generation from a predicted amount of load to be required for the load during the time t1 to t2. In other words, $S_{t12}$ is the power amount that is predicted to be, in principle, necessary to be covered by the storage battery 12.

$S_{t23}$ is an amount of power that is calculated by subtracting a predicted load power amount to be required for the load from a predicted amount of power to be generated by photovoltaic power generation during the time t1 to t2.

Here, the predicted charge amount is a value obtained by subtracting $S_{t12}$ from $S_{t23}$. In other words, the predicted charge amount is the value obtained by subtracting the load power amount from the generated power amount in the prediction segment 60 (time t1 to t3).

SOC, which is the charge state of the storage battery 12 predicted by the system controller 2, will be explained on the basis of a predicted transition of SOC shown in FIG. 2. The storage battery 12 is charged by using the system power supply 50 so that it will be in a predetermined SOC by the time t1. From the time t1 to the time t2, the storage battery 12 discharges to supply the power calculated by subtracting the power generated by photovoltaic power generation from the load power required for the load 51, and as a result, SOC decreases. From the time t2 to the time t3, the storage battery 12 is charged with the surplus power calculated by subtracting the load power required for the load 51 from the power generated by photovoltaic power generation, and as a result, SOC increases. After the time t3, because the load power is larger than the power generated by photovoltaic power generation, the storage battery 12 discharges to cover the power shortage, and as a result, SOC decreases.

The SOC fluctuation in the time including t1 to t3 shown in FIG. 2 is shown using straight lines since a conceptual diagram is shown, but the load power and the generated power fluctuate in a curved manner in reality, and thus the SOC fluctuation is not necessarily linear. From the time t1 to the time t2, the storage battery 12 discharges by changing its current value so as to discharge in response to the load power required for the load 51.

Next, how the system controller 2 controls the charge and discharge of the storage battery 12 will be explained in detail using FIG. 2. When it is predicted that the generated power amount is larger than the load power amount ($S_{t23}>S_{t12}$) in the prediction segment 60 (time t1 to t3), the system controller 2 controls the charge into the storage battery 12 from the system power supply 50 so that the charge state of the storage battery 12 at the start point of the prediction segment 60 will be a charge state which allows the predicted charge amount of photovoltaic power generation to be entirely charged into the storage battery 12, the predicted charge amount being calculated by subtracting the load power amount from the generated power amount in the prediction segment 60.

That is, the predetermined charge state at the time t1 is a charge state in which at least the predicted charge amount (=$St23-S_{t12}$) can be charged to the full charge state of the storage battery 12 (SOC=100%) in order for the predicted charge amount of photovoltaic power generation to be entirely used for charging the storage battery 12. The predetermined charge state is predicted by the system controller 2. According to Embodiment 1 of the present invention, the storage battery 12 is charged up, during the late-night power time slot (11 PM to 7 AM) offering an inexpensive power rate, to the charge state at the time t1 where the predicted charge amount can be charged into the storage battery 12, thus leading to an economical advantage.

In the prediction segment 60 (time t1 to t3), the system controller 2 discharges the storage battery 12 in the first segment 61 (time t1 to t2) and charges the storage battery 12 with all of the surplus power in the second segment 62 (time t2 to t3). The system controller 2 according to Embodiment 1 of the present invention predicts the generated power and the load power, and controls the storage battery 12 so that the storage battery 12 can be fully charged (SOC=100%) at the time t3, and thereby the full charge holding time can be decreased to suppress deterioration of the storage battery 12, thus leading to its longer product life.

When it is predicted that the generated power amount is smaller than or equal to the load power amount ($S_{t23}<S_{t12}$ or $S_{t23}=S_{t12}$) in the prediction segment 60, the predicted charge amount to be charged into the storage battery 12 is zero, and thus it is sufficient that the system controller 2 controls the storage battery 12 to be charged up to a full charge state by the time t1.

In the photovoltaic power generation system 100 according to Embodiment 1 of the present invention, the surplus power which is not consumed by the load 51 and remained in the power generated by photovoltaic power generation during the time t2 to t3, is entirely charged into the storage battery 12. Therefore, with respect to a predicted value for the amount of the power generated by photovoltaic power generation in the prediction segment 60, it is desirable for the PV-power prediction device 3 to set the maximum value as the predicted value from among power generation amounts predicted from weather information, and with respect to a predicted value for the load power amount in the prediction segment 60, it is desirable for the load-power prediction device 4 to set the minimum value as the predicted value from among load power amounts predicted from the date and time or the day of the week. By doing so, even if the predictions include errors, the situation in which the surplus power cannot be entirely charged into the storage battery 12 can be fairly avoided.

Further, since the learning device 5 is provided to correct, by using actually measured load power, the patterns of the load 51 according to the date and time or the day of the week held in the load-power prediction device 4, the learning device 5 learns the status of use of the load 51 according to the user's life pattern so that the patterns of the load 51 can be updated or selected. Therefore, because the highly accurate patterns of the load 51 tailored to the user can be predicted and used, the prediction accuracy of the photovoltaic power generation system 100 can be improved.

Also, in consideration of prediction errors, the predetermined charge state at the time t1 may be set to a value smaller than the charge state predicted by the system controller 2. By doing so, even if the predictions include errors, the situation in which the surplus power cannot be entirely charged into the storage battery 12 can be fairly avoided. The prediction error can be obtained, for example, from the past prediction information stored in the learning device 5.

Figure 3:
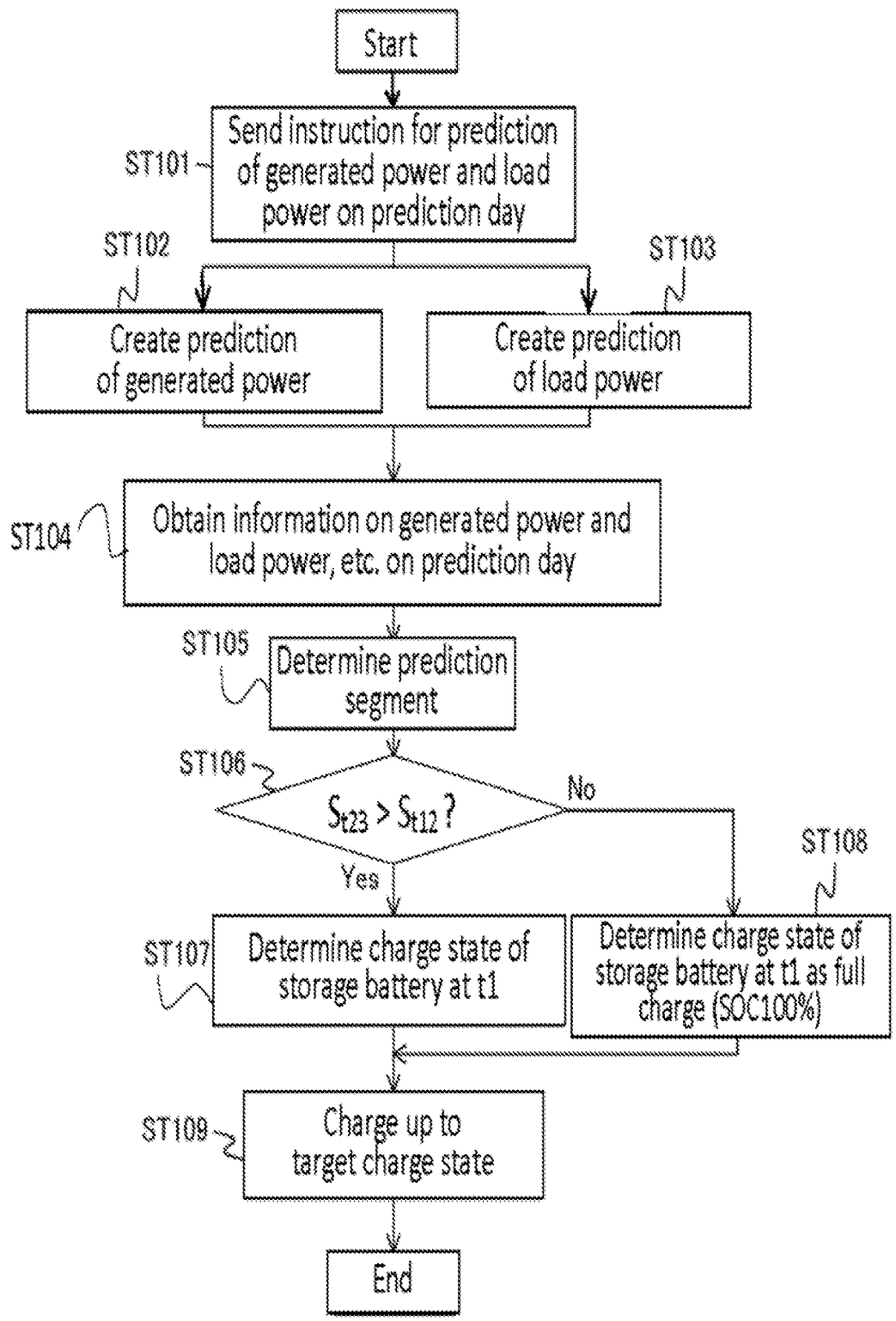
FIG. 3 is a flowchart describing operation of a storage-battery control device according to Embodiment 1 of the present invention during a late-night power time slot.
Figure 6:
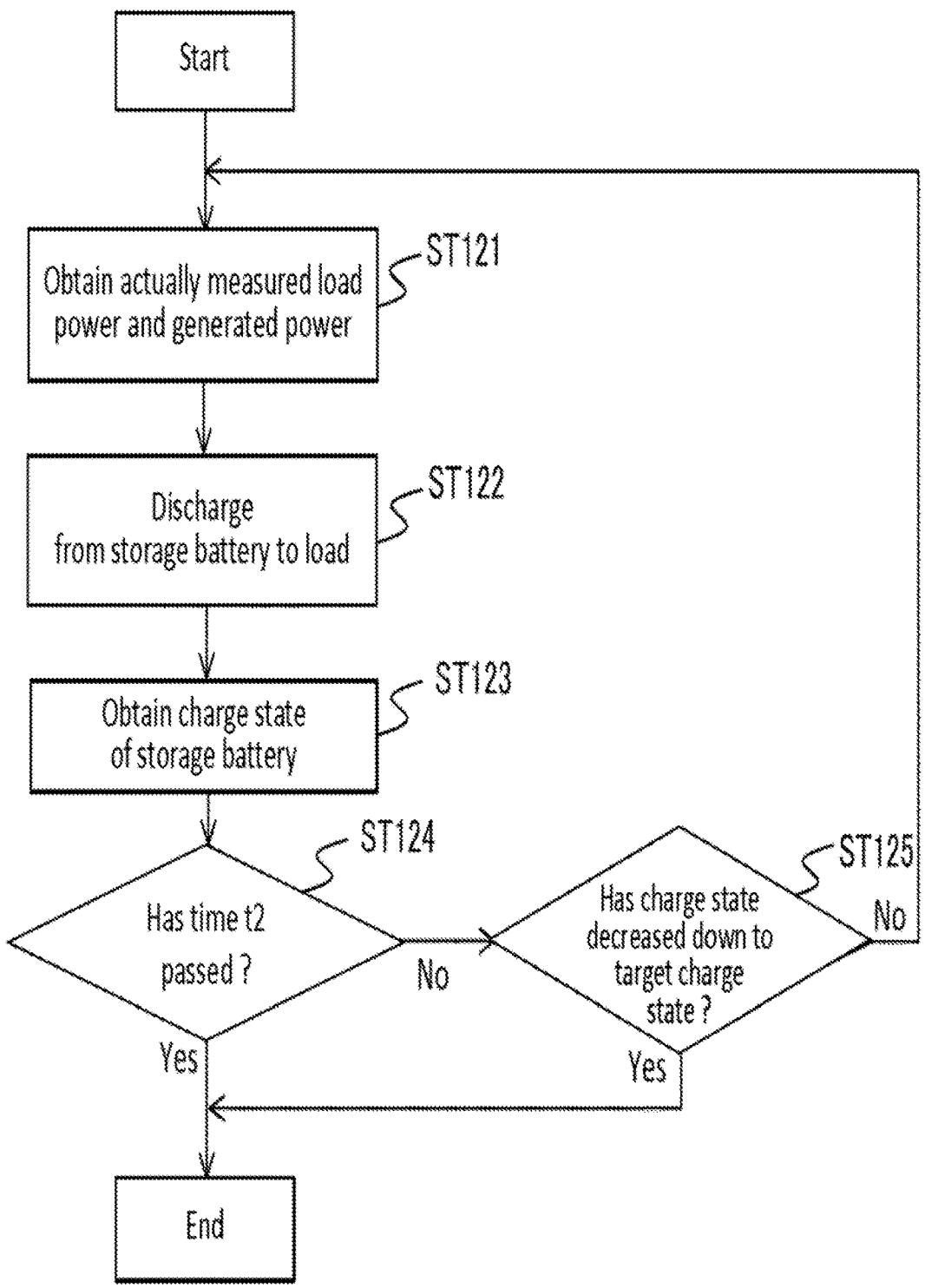
FIG. 6 is a flowchart describing operation of a system controller according to Embodiment 1 of the present invention during a first segment (time t1 to t2).
Figure 7:
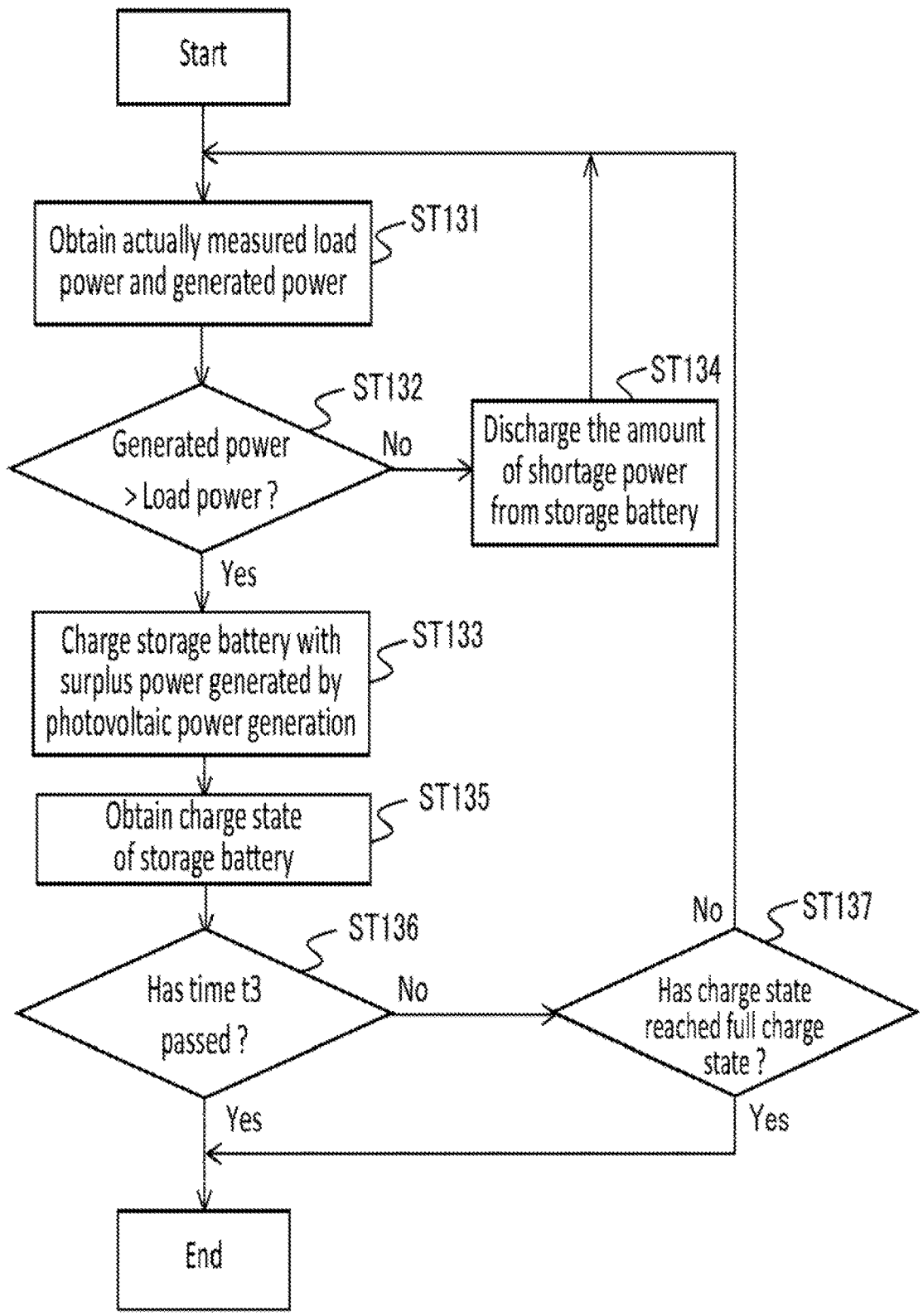
FIG. 7 is a flowchart describing operation of the system controller according to Embodiment 1 of the present invention during a second segment (time t2 to t3).

Next, specific operation of the photovoltaic power generation system 100 according to Embodiment 1 of the present invention will be explained. FIG. 3 is a flowchart describing operation of the storage-battery control device 1 according to Embodiment 1 of the present invention in the late-night power time slot. FIG. 6 is a flowchart describing operation of the system controller 2 according to Embodiment 1 of the present invention in the time t1 to t2 of the prediction segment 60. FIG. 7 is a flowchart describing operation of the system controller 2 according to Embodiment 1 of the present invention in the time t2 to t3 of the prediction segment 60.

Now, FIG. 3 is explained. The flowchart in FIG. 3 starts from the start time (11 PM) of the late-night power time slot. In step ST 101, for predicting the generated power by photovoltaic power generation and the load power required for the load 51 on a prediction day, the system controller 2 sends a signal to make the PV-power prediction device 3 predict the generated power, and sends a signal to make the load-power prediction device 4 predict the load power. Note here that when the process shown in a flowchart of FIG. 3 is executed between 11 PM and 12 PM, the prediction day is the next day, and when the process shown in a flowchart of FIG. 3 is executed after 12 PM, the prediction day is this very day.

In step ST 102, upon receiving a signal from the system controller 2, the PV-power prediction device 3 creates the prediction pattern of the generated power on the prediction day. The PV-power prediction device 3 sends the created prediction of the generated power on the prediction day to the system controller 2. In the same manner, in step ST 103, upon receiving a signal from the system controller 2, the load-power prediction device 4 creates the prediction pattern of the load power on the prediction day. The load-power prediction device 4 sends the created prediction of the load power on the prediction day to the system controller 2. Note that, when predicting the load power, the load-power prediction device 4 creates the prediction of the load power in consideration of actual measurement values of the load power in the past stored in the learning device 5.

In step ST 104, the system controller 2 obtains predictions of the generated power and the load power on the prediction day respectively predicted from the PV-power prediction device 3 and the load-power prediction device 4.

In step ST 105, using the predictions of the generated power by photovoltaic power generation and the load power required for the load 51 respectively obtained from the P power prediction device 3 and the load-power prediction device 4, the system controller 2 determines the prediction segment 60 (the first segment 61 and the second segment 62) on the prediction day. The system controller 2 estimates, as the end point (time t3) of the prediction segment 60, a time at which the obtained power generated by photovoltaic power generation decreasing after passing its peak becomes equal to the load power. In Embodiment 1 of the present invention, the start point (time t1) of the prediction segment 60 is a predetermined time such as 7 AM at which the late-night power time slot ends. Also, the system controller 2 estimates, as the time t2, a time at which the generated power increasing after the start of power generation by the photovoltaic power generation device 101 is predicted to become equal to the load power. Through these steps above, the system controller 2 can determine the prediction segment 60 (time t1 to t3), the first segment 61 (time t1 to t2), and the second segment 62 (time t2 to t3).

In step ST 106, the system controller 2 compares the amount of power obtained from the prediction of the generated power by photovoltaic power generation with the amount of power obtained from the prediction of the load power required for the load 51 in the prediction segment 60 on the prediction day. When the system controller 2 determines that the generated power amount is larger than the load power amount in the prediction segment 60, the process proceeds to step ST 107. When the system controller 2 determines that the generated power amount is smaller than the load power amount in the prediction segment 60, the process proceeds to step ST 108.

Note that the comparison between the load power amount and the generated power amount in the prediction segment 60 is equivalent to the comparison between $S_{t12}$ and $S_{t23}$ in FIG. 2. That is, the system controller 2 may have the process proceed to ST 107 when $S_{t23}$ is equal to or larger than $S_{t12}$, and to ST 108 when $S_{t23}$ is smaller than $S_{t12}$.

In step ST 107, the system controller 2 determines the charge state of the storage battery 12 at the time t1. The charge state of the storage battery 12 at the time t1 is the charge state in which the predicted charge amount is predicted to be able to be entirely charged.

Because the system controller 2 determines that the generated power amount is smaller than the load power amount in the prediction segment 60, the prediction in step ST 108 means that predicted charge amount is zero. This means that, with only the generated power amount by the photovoltaic power generation device 101, it is predicted that the power may run short. Therefore, it is desirable to charge the storage battery 12 up to the full charge state (SOC=100%) at the time t1. Thus, the system controller 2 determines to charge the storage battery 12 up to the full charge state at the time t1.

In step ST 109, the system controller 2 charges the storage battery 12 up to the charge state of the storage battery 12 at the time t1, determined in step ST 107 or step ST 108, finishes charging when the target charge state is reached, and ends the execution of the flowchart.

Note that the system controller 2 can charge the storage battery 12 up to the target state of charge by the time t1 using the system power supply 50 in the late-night power time slot offering an inexpensive power rate. Because the system power supply 50 is used for charging, it is highly improbable that the storage battery 12 is not charged up to the target state of charge at the time t1. There will be almost no need to predict the generated power and the load power again after the time t1 on the assumption that the storage battery 12 is not charged up to the target state of charge at the time t1. The system controller 2, therefore, should control the storage battery 12 on the basis of the predictions of the generated power and the load power in the time t1 to t3, the time being predicted in the late-night power time slot.

Figure 4:
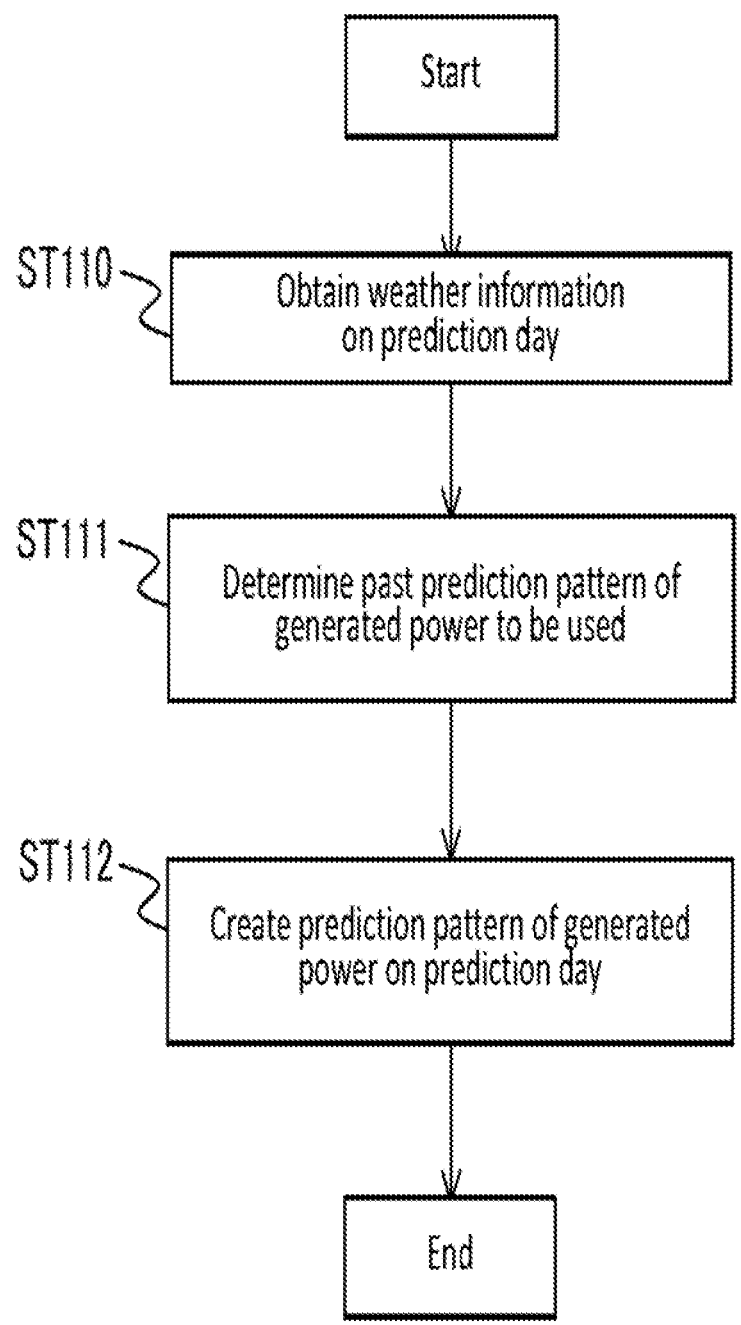
FIG. 4 is a flowchart describing an example of a method to create a prediction pattern of the generated power according to Embodiment 1 of the present invention.

Here, a method to create the prediction pattern of the generated power on the prediction day regarding step ST 102 in FIG. 3 will be explained using FIG. 4. FIG. 4 is a flowchart showing an example of a method to create the prediction pattern of the generated power according to Embodiment 1 of the present invention. Upon receiving an instruction signal from the system controller 2 to perform the prediction of the generated power, the PV-power prediction device 3 starts the execution of the flowchart in FIG. 4.

In step ST 110, the PV-power prediction device 3 obtains the weather information of the prediction day, for example, from the Internet.

In step ST 111, the PV-power prediction device 3 obtains the past weather information and the corresponding prediction patterns of the generated power. Then, the PV-power prediction device 3 compares the weather information on the prediction day with the obtained past weather information, and determines, when the weather information agrees with each other, to use the prediction pattern of the generated power corresponding to the past weather information for creating the prediction pattern of the generated power on the prediction day. When the weather information is compared, not only weather conditions such as a cloudy condition but also information such as precipitation probability, humidity, and atmospheric temperature may be taken into consideration. Note that, in a case where the past weather information and the corresponding prediction pattern of the generated power are stored, for example, in the storage-battery control device 1, the PV-power prediction device 3 may use the past weather information and the corresponding prediction pattern of the generated power that are stored, or may obtain such information from the Internet, etc.

In step ST 112, the PV-power prediction device 3 creates the prediction pattern of the generated power on the prediction day on the basis of the past prediction pattern of the generated power determined in step ST 111. The PV-power prediction device 3 may create the prediction pattern of the generated power on the prediction day by correcting the past prediction pattern of the generated power, considering weather conditions such as precipitation probability, humidity, and atmospheric temperature. With such correction, the prediction pattern of the generated power on the prediction day will be more accurate. The PV-power prediction device 3 outputs the created prediction pattern of the generated power on the prediction day to the system controller 2.

Note that, in step ST 111, when obtaining the prediction patterns of the generated power, it is desirable for the PV-power prediction device 3 to obtain the prediction patterns of the generated power in the period corresponding to, for example, the prediction day of May 15, 2016. For example, in a case where the prediction day is May 15, 2016, the PV-power prediction device 3 obtains the prediction pattern of the generated power on the day of May 15 in a year before 2016 (for example, May 15, 2015). Of course, the PV-power prediction device 3 may also obtain the prediction patterns of the generated power in a predetermined period (for example, May 5 to May 25) centered on the day corresponding to the prediction day in a past year. Thus, the influence of the changes in the amount of solar radiation and the sunshine duration depending on a season can be reduced, so that the PV-power prediction device 3 can create a more accurate prediction pattern of the generated power.

Figure 5:
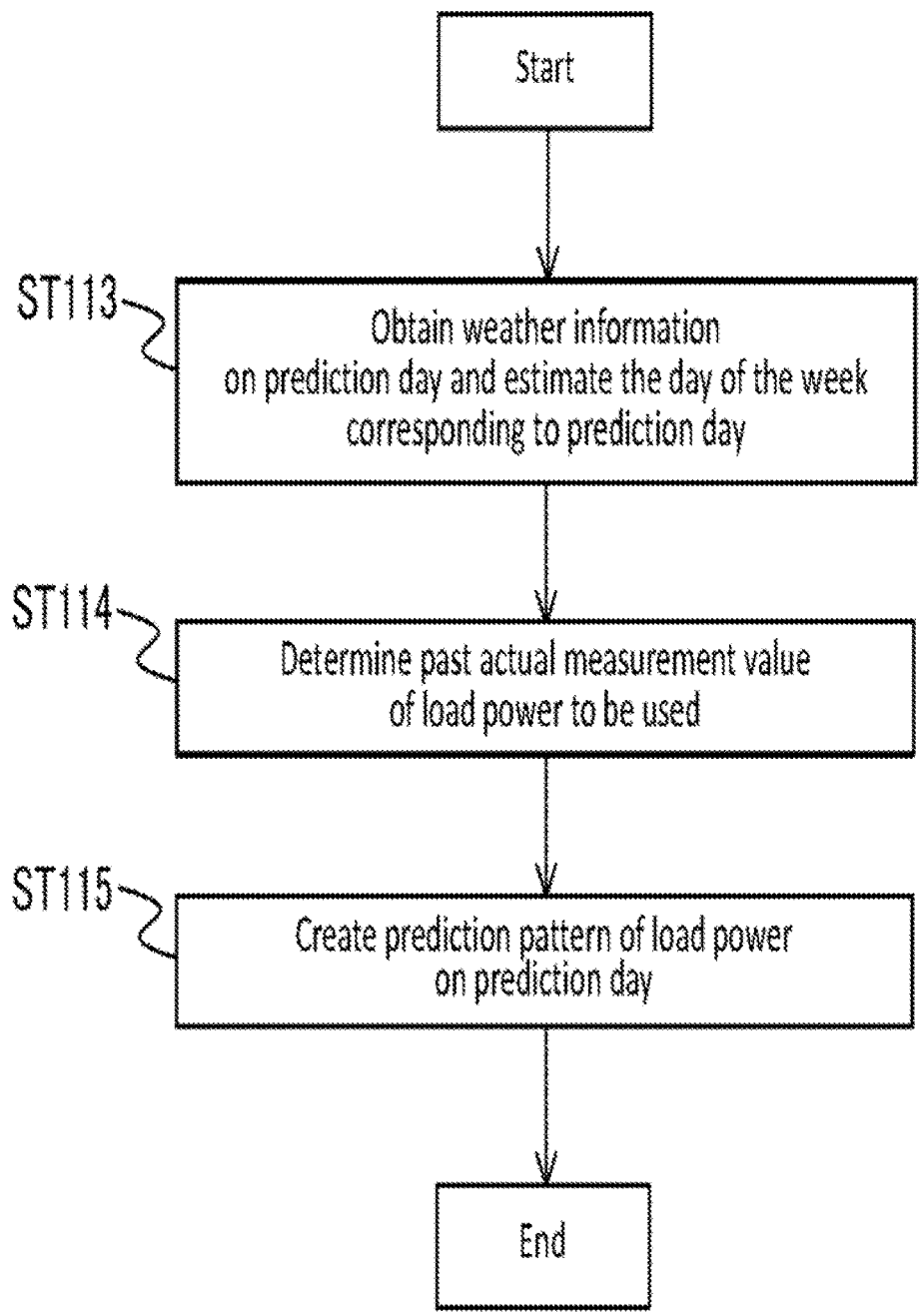
FIG. 5 is a flowchart describing an example of a method to create a prediction pattern of the load power according to Embodiment 1 of the present invention.

Next, an example of a method used in step ST 103 of FIG. 3 to create the prediction pattern of the load power on the prediction day will be explained using FIG. 5. FIG. 5 is a flowchart describing an example of a method to create the prediction pattern of the load power according to Embodiment 1 of the present invention. Upon receiving an instruction signal from the system controller 2 to conduct the prediction of the load power, the load-power prediction device 4 starts the execution of the flowchart in FIG. 5.

In step ST 113, the load-power prediction device 4 obtains the weather information on the prediction day, for example, from the Internet. Also, in step ST 113, the load-power prediction device 4 estimates the day of the week corresponding to the prediction day.

In step ST 114, the load-power prediction device 4 obtains the actual measurement value of the past load power and the day of the week corresponding to the day on which the actual measurement value was measured, which are recorded in the learning device 5. The load-power prediction device 4 compares the obtained day of the week corresponding to the day on which the actual measurement value of the past load power was measured with the day of the week on the prediction day. When the days of the week are the same, it determines to use the obtained actual measurement value of the past load power for creating the prediction pattern of the load power on the prediction day. In the comparison, the load-power prediction device 4 may, of course, take the meteorological information, besides the day of the week, such as a weather condition, precipitation probability, humidity, and atmospheric temperature into consideration.

In step ST 115, the load-power prediction device 4 creates the prediction pattern of the load power on the prediction day on the basis of the actual measurement value of the past load power determined in step ST 114. Considering the weather conditions such as precipitation probability, humidity, and atmospheric temperature, the load-power prediction device 4 may correct the actual measurement value of the past load power to create the prediction pattern of the load power on the prediction day. Through this correction, the prediction pattern of the load power on the prediction day will be more accurate. Then, the load-power prediction device 4 outputs the developed prediction pattern of the load power on the prediction day to the system controller 2.

In step ST 114, as is the case in step ST 111, when obtaining the actual measurement value of the past load power, it is desirable for the load-power prediction device 4 to obtain the prediction pattern of the load power in the corresponding period, and it may, of course, obtain the prediction pattern of the load power in a predetermined period centered on the corresponding day in a past year before the prediction day. By doing so, when creating the prediction pattern of the load power, the influence of the changes in the surrounding environment depending on a season can be reduced, so that the load-power prediction device 4 can easily create a more accurate prediction pattern of the load power. The load-power prediction device 4, of course, may obtain the day of the week corresponding to the date, for example, from the Internet.

Next, FIG. 6 will be explained. FIG. 6 is a flowchart describing operation of the system controller 2 according to Embodiment 1 of the present invention in the first segment 61 (time t1 to t2). The execution of the flowchart starts at the time t1.

In step ST 121, the system controller 2 obtains the actual measurement values of the generated power by photovoltaic power generation via the BMU 14 of the power storage device 11 and the load power required for the load 51 via the BMU 14 of the power storage device 11.

The generated power by photovoltaic power generation is used for the load power, but there will be shortage which cannot be covered only by the generated power. In step ST 122, based on the information obtained in step ST 121 on the actual measurement values of the generated power and the load power, the system controller 2 covers, by making the storage battery 12 discharge, the shortage of the load power which cannot be covered only by the generated power. In Embodiment 1 of the present invention, in accordance with the shortage value of the load power which cannot be covered by the generated power, the output value of the power storage device 11 is changed by changing its current value. By the discharge from the power storage device 11, the shortage of the load power which cannot be covered only by the generated power can be covered.

In step ST 123, the system controller 2 obtains the charge state of the storage battery 12, which has changed owing to the discharge.

In step ST 124, when determining that the time t2 is passed, the system controller 2 ends the execution of the flowchart, and when determining that the time t2 has not been passed, the system controller 2 make the process proceed to step ST 125.

In step ST 125, when determining that the charge state of the storage battery 12 has decreased down to the target state of charge, the system controller 2 ends the execution of the flowchart, and when determining that the charge state of the storage battery 12 has not decreased down to the target state of charge, the system controller 2 makes the process proceeds to step ST 121.

Here, FIG. 7 will be explained. FIG. 7 is a flowchart describing operation of the system controller 2 according to Embodiment 1 of the present invention in the second segment 62 (time t2 to t3). The execution of the flowchart in FIG. 7 starts at the time t2.

In step ST 131, the system controller 2 obtains the actual measurement values of the generated power by photovoltaic power generation and the load power required for the load 51 via the BMU 14 of the power storage device 11.

In step ST 132, the system controller 2 compares the absolute value of the generated power with the absolute value of the load power, which are respectively known from the actual measurement values of the generated power by photovoltaic power generation and the load power required for the load 51 obtained in step ST 131. When the generated power is larger than the load power, the process proceeds to step ST 133, and when the generated power is equal to or smaller than the load power, the process proceeds to step ST 134.

In step ST 133, the system controller 2 charges the storage battery 12 using the surplus power which is not consumed by the load 51 from among the generated power by photovoltaic power generation.

Step ST 134 is a step to cope with the case when the prediction and the actual measurement of the load power or the generated power deviate greatly due to some failure, etc. The system controller 2 makes the storage battery 12 discharge to cover the shortage of the power for the load power which cannot be covered by the generated power, and the process proceeds to step ST 131.

In step ST135, the system controller 2 obtains the charge state of the storage battery 12 because the charge state of the storage battery 12 changes owing to the charge.

In step ST136, when determining that the time t3 has passed, the system controller 2 ends the execution of the flowchart, and when determining that the time t3 has not been passed, the system controller 2 makes the process proceeds to step ST 137. In step ST 137, when determining that the charge state of the storage battery 12 has reached the full charge state, the system controller 2 ends the execution of the flowchart. When determining that the charge state of the storage battery 12 has not yet reached the full charge state, the system controller 2 makes the process proceeds to step ST 131.

Figure 8:
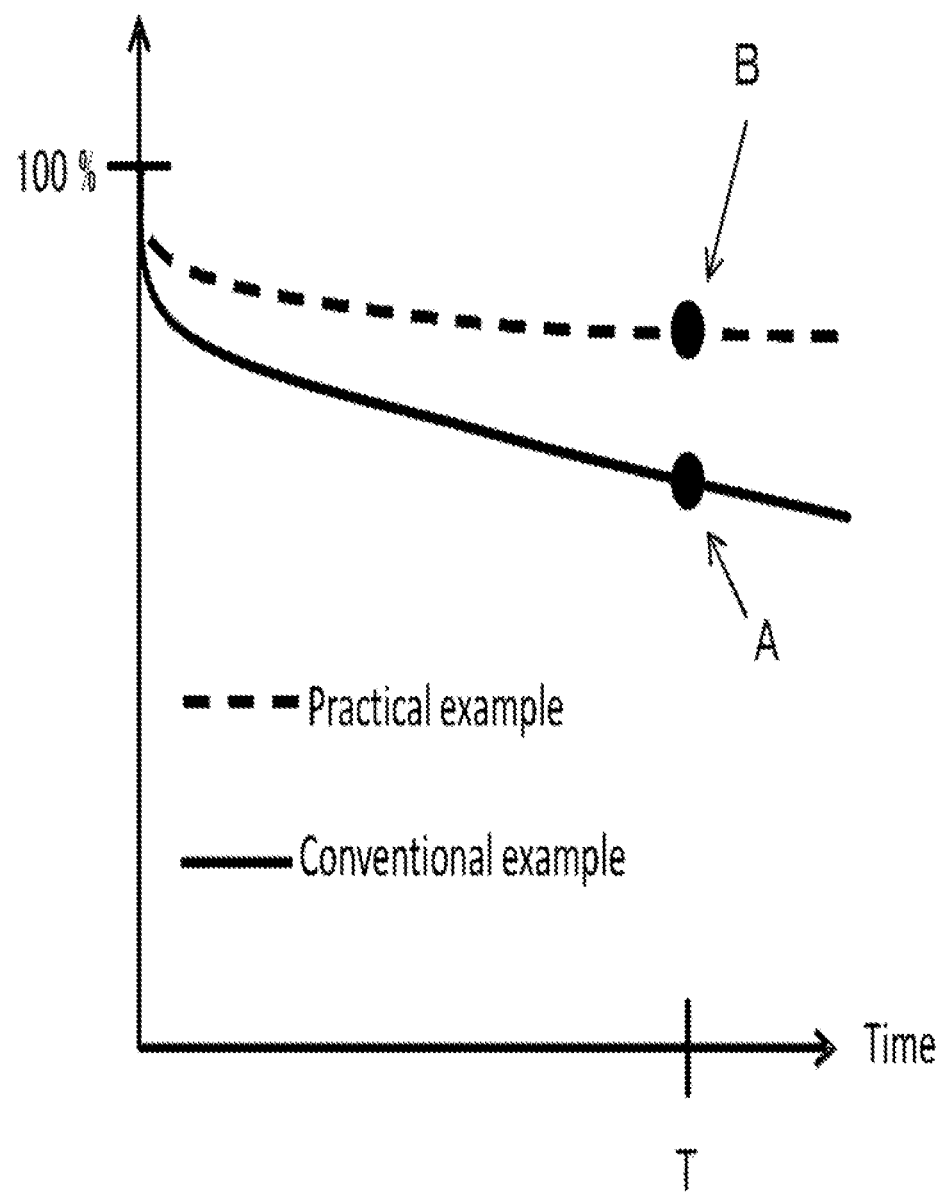
FIG. 8 is a conceptual graph showing an improvement effect in a capacity retention rate of a storage battery to which the present invention is applied.

FIG. 8 is a conceptual graph showing the improvement effect in a capacity retention rate of the storage battery 12 when the present invention is applied thereto. In FIG. 8, the solid line is shown for a conventional example and the broken line is shown for a practical example to which the present invention is applied. In FIG. 8, the origin of the graph indicates the start point in the comparison where both the capacity retention rates regarding the storage battery 12 to which the present invention is applied and the conventional storage battery 12 are 100%. The time T is a time about ten years later after the beginning of the comparison, where the point A indicates the capacity retention rate, at the time T, of the conventional storage battery 12, and the point B indicates the capacity retention rate, at the time T, of the storage battery 12 to which the present invention is applied. When the capacity retention rate for the storage batteries 12 at the point A is compared with that at the point B, the capacity retention rate at the point B of the storage battery 12 to which the present invention is applied is higher than that at the point A, and an improvement of 5 to 10% can be expected.

In the prediction segment 60 (time t1 to t3), the system controller 2 controls the charge state of the storage battery 12 so that the surplus power can be entirely charged into the storage battery 12, thereby enabling a reduction in the generation of the surplus power. Therefore, it will be possible to avoid restraint in the power generation by photovoltaic power generation aiming at suppressing the voltage rise in the system power supply due to the sale to the surplus power, and thus improvement in economic efficiency can be expected.

Next, an example will be explained using specific values. When the system controller 2 determines that the start time (11 PM) of the late-night power time slot on Jan. 20, 2015 has been passed, the system controller 2 makes the PV-power prediction device 3 and the load-power prediction device 4 respectively predict the generated power and the load power on the prediction day (Jan. 21, 2015).

When predicting the generated power on the prediction day, the PV-power prediction device 3 obtains the weather data and the solar radiation amount data on the predicting day, that is, Jan. 21, 2015, from the Internet, and predicts the generated power on the prediction day from the obtained data and the capacity of the photovoltaic power generation device 101. When predicting the expected load power, the load-power prediction device 4 uses the learning device 5.

As for the storage battery 12, it is assumed that the discharge capacity is 60 Ah, the battery capacity is 6 kWh, and the average single cell voltage is 3.7 V and 27 cells are in series. The charge state of the storage battery 12 ranges from the lowest where SOC=0% to the highest where SOC=100%. Also, it is assumed that the maximum generated power of the photovoltaic power generation device 101 is 2.0 kW (100 V) and the voltage of the system power supply 50 is 100 V.

Let the end time of the late-night power time slot be 7 AM (time t1) and it is assumed that the PV-power prediction device 3 predicts the output of the photovoltaic power generation device 101 starting at 8 AM and ending at 3 PM. Also, it is assumed that fine weather is predicted as a weather condition in predicting the generated power. Further, it is assumed that, from the predictions of the load power and the generated power, the system controller 2 has predicted the time t2 to be 9:20 AM and the time t3 to be 1:42 PM.

Note that, the system controller 2 predicts the generated power amount in the time t1 to t3 to be 8.7 kWh (0.91 kWh during time t1 to t2, 7.79 kWh during the time t2 to t3). Also, the system controller 2 predicts that the load power amount to be required for the load 51 between t1 and t3 is 6.53 kWh (2.84 kWh during time t1 to t2, 3.69 kWh during the time t2 to t3). Thus, $S_{t12}$ is 1.93 kWh (=2.84 kWh−0.91 kWh) and $S_{t23}$ is 4.1 kWh (=7.79 kWh−3.69 kWh).

From 7 AM (time t1) to 8 AM, the load power required for the load 51 is covered by the discharge from the storage battery 12. From 8 AM, the generated power is available from the photovoltaic power generation device 101, and the load power and the generated power become equal at 9:20 AM (time t2). To be more specific, the power storage device 11 outputs $S_{t12}$(=1.93 kWh) from 7 AM (time t1) to 9:20 AM (time t2).

The system controller 2 predicts that, from 9:20 AM (time t2) to 1:42 PM (time t3), the generated power exceeds the load power to produce surplus power. In Embodiment 1 of the present invention, the system controller 2 charges the storage battery 12 with all of the generated surplus power. The system controller 2 predicts that the predicted charge amount to be generated is 2.17 kWh calculated by subtracting $S_{t12}$(=1.93 kWh) from St2 (=4.1 kWh).

Here, considering that the storage battery 12 is to be discharged from 7 AM (time t1) to 9:20 AM (time t2), the system controller 2 determines the charge state of the storage battery 12 at the time t1 at which the charging in the late-night power time slot is terminated so that the entire predicted charge amount will be charged into the storage battery 12. Then, assuming the charge state of the storage battery 12 at the time t1 to be a charge state as SOC=63.8% ($\approx$100−(4.1 kWh−1.93 kWh)/6 kWh×100), the system controller 2 estimates that the predicted charge amount can be entirely charged into the storage battery 12. Therefore, it is sufficient that the storage battery 12 is charged up to the charge state as SOC=63.8% by the time (time t1) at which the late-night power time slot ends. Also, considering a prediction error, etc., the charge state of the storage battery 12 may be charged up to a percentage lower than SOC=63.8%.

Figure 9:
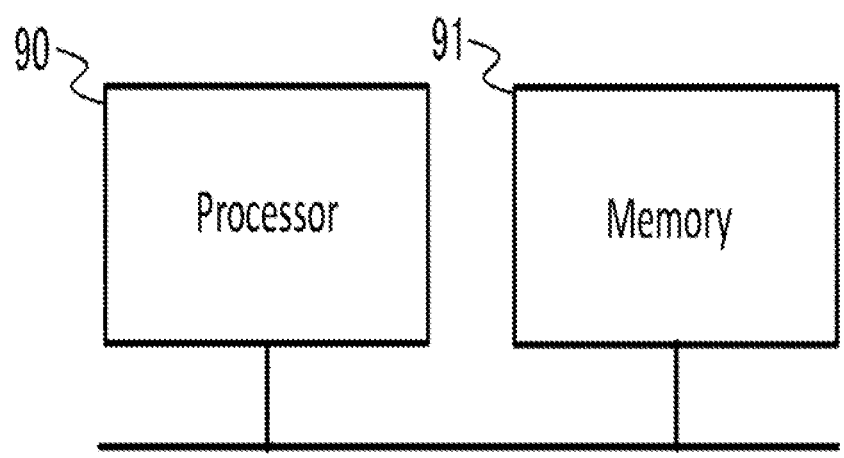
FIG. 9 is a hardware configuration diagram of the system controller of the storage-battery control device according to Embodiment 1 of the present invention.

FIG. 9 is a hardware configuration diagram of the system controller 2 of the storage-battery control device 1 according to Embodiment 1 of the present invention. The process of the system controller 2 in the storage-battery control device 1 is carried out when a program recorded in a memory 91 shown in FIG. 9 is executed by a processor 90 such as a control processing unit (CPU). The processor and/or the memory may be included not only in the system controller 2 but also in the PV-power prediction device 3, the load-power prediction device 4, and/or the learning device 5.

As described above, the storage-battery control device 1 according to Embodiment 1 of the present invention includes the load-power prediction device 4 to predict the load power required for the load 51, the PV-power prediction device 3 to predict the generated power by photovoltaic power generation, and the system controller 2, in the prediction segment 60 whose start point is a predetermined time and whose end point is a time at which the generated power is predicted to become equal to the load power after the photovoltaic power generation started, the generated power passed its peak, and then decreased, when the generated power amount meaning a summation of the generated power is larger than the load power amount meaning a summation of the load power, to control the charge state of the storage battery 12 charged from the system power supply 50 so that the charge state of the storage battery 12 at the start point can be a charge state which allows the predicted charge amount generated by photovoltaic power generation to be entirely charged into the storage battery 12, the predicted charge amount being obtained by subtracting the load power amount from the generated power amount.

Also, the storage-battery charge/discharge system 10 according to Embodiment 1 of the present invention includes the storage-battery control device 1 and the power storage device 11 having the storage battery and the power conditioner 13 for the storage battery to convert power into DC power or AC power in charging and discharging the storage battery 12.

Also, the photovoltaic power generation system 100 according to Embodiment 1 of the present invention includes the storage-battery charge/discharge system 10, the solar panel 102 which is a panel for photovoltaic power generation, and the photovoltaic power generation device 101 equipped with the power conditioner 103 for PV to convert the power generated by the solar panel 102 from DC power to AC power.

Also, in the storage-battery control method according to Embodiment 1 of the present invention, the load-power prediction device 4 predicts the load power required for the load 51, the PV-power prediction device 3 predicts the generated power by photovoltaic power generation, and the system controller 2, in the prediction segment whose start point is a predetermined time and whose end point is a time at which the generated power by photovoltaic power generation is predicted to become equal to the load power after the photovoltaic power generation started, the generated power passed its peak, and then decreased, when the generated power amount meaning a summation of the generated power is larger than the load power amount meaning a summation of the load power, to control the charge state of the storage battery 12 charged from the system power supply 50 so that the charge state of the storage battery 12 at the start point can be a charge state which allows the predicted charge amount generated by photovoltaic power generation to be entirely charged into the storage battery 12, the predicted charge amount being obtained by subtracting the load power amount from the generated power amount.

Conventionally, because the value for the charge state of the storage battery 12 is not fixed, when the power cannot be sold to the system power supply 50, the surplus power cannot be entirely charged into the storage battery 12, and therefore, the power generation by a PV generator must be restrained. On the other hand, with such operation, to be prepared for a case in which the surplus power cannot be sold to the system power supply 50, the charge state of the storage battery 12 is controlled so that the surplus power generated by photovoltaic power generation can be entirely charged into the storage battery 12. Thus, the surplus power will not be wasted, and economic efficiency can be improved.

Also, because the storage battery 12 is controlled to be fully charged (SOC=100 [%]) at the time t3, it is possible to keep the charge state for the rest of the time lower than the full charge state; in other words, the full charge holding time and the time at which the charge state of the storage battery 12 is high can be shortened. Thus, the deterioration of the storage battery 12 can be suppressed to extend its life expectancy.

Further, during the prediction segment 60, in the first segment 61 in which an end point is a time at which the generated power increasing from a start point is predicted to become equal to the load power, the system controller may discharge the storage battery 12, and in the second segment 62 from the end point of the first segment 61 to a time at which the decreasing generated power is predicted to become equal to the load power, the system controller may charge the storage battery 12 with all of surplus power which is calculated by subtracting the load power from the generated power.

With such operation, because the discharging time slot of the storage battery 12 and the charging time slot thereof can be distinctly separated, controllability of the storage battery 12 will be improved.

With respect to the predicted value of the generated power amount by photovoltaic power generation in the prediction segment 60, the PV-power prediction device 3 may adopt the maximum value as the predicted value from among generated power amounts predicted on the basis of the weather information.

With this operation, since the predicted value of the generated power amount by photovoltaic power generation is the maximum value from among values predicted from the weather information, even if the prediction includes an error, the situation in which the generated power by photovoltaic power generation cannot be entirely used for the load power and/or for charging the storage battery 12 can be fairly avoided.

With respect to the predicted value of the load power amount in the prediction segment 60, the load-power prediction device 4 may adopt the minimum value as the predicted value from among load power amounts predicted from the date and time or the day of the week.

With this operation, since the load-power prediction device 4 uses the minimum value from among load power amounts predicted on the basis of the date and time or the day of the week, even if the prediction includes an error, the situation in which the generated power by photovoltaic power generation cannot be entirely used for the load power and for charging the storage battery 12 can be fairly avoided.

Further, the learning device 5 may be included in the system configuration, which corrects, by the use of measured load power, the patterns of the load 51 corresponding to the date and time or the day of the week held in the load-power prediction device 4.

With this configuration, the learning device 5 learns the actual status of use of the load 51 in accordance with the user's life pattern, and thereby the patterns of the load 51 can be updated or selected. Therefore, because the highly accurate patterns of the load 51 tailored to the user can be predicted and used, the prediction accuracy of the photovoltaic power generation system 100 can be improved.

Embodiment 2

A photovoltaic power generation system 100 according to Embodiment 2 of the present invention will be explained using FIG. 10.

In the photovoltaic power generation system 100 according to Embodiment 1, an example is explained in which the current value is changed during the discharge in the power storage device 11 to be able to deal with the situation where the load power required for the load 51 fluctuates. In Embodiment 2 of the present invention, a variation will be explained where a constant current value is used during the discharge in the power storage device 11 in the first segment 61.

Explanation below will be focusing on the points different from Embodiment 1, and explanation on the same or the equivalent portions will be omitted when appropriate.

Figure 10:
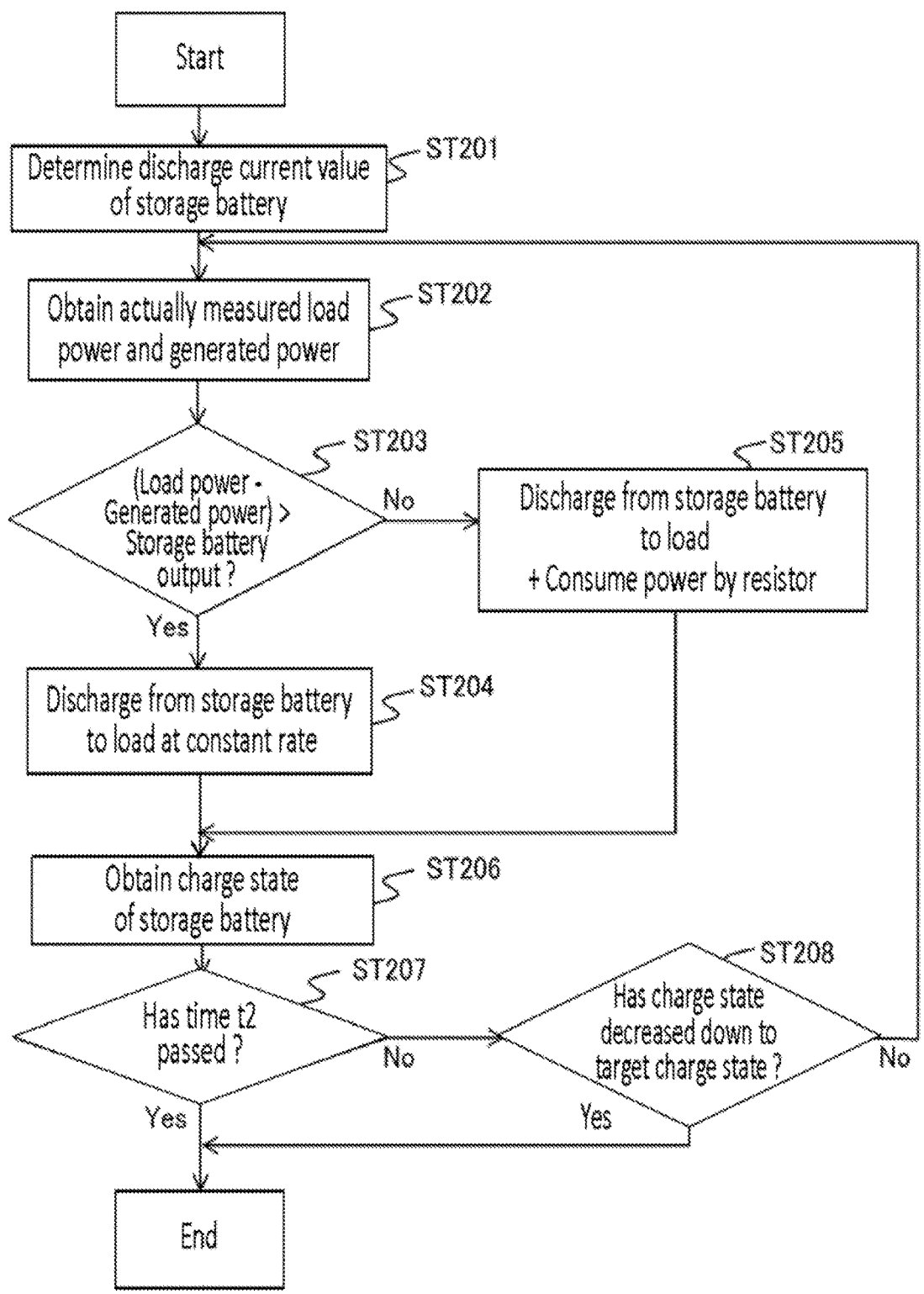
FIG. 10 is a flowchart describing operation of a system controller according to Embodiment 2 of the present invention during the first segment (time t1 to t2).

FIG. 10 is a flowchart describing operation of a system controller 2 according to Embodiment 2 of the present invention in the first segment 61 (time t1 to t2). When the flowchart in FIG. 10 is compared with that in FIG. 6, step ST 121 corresponds to step ST 202, step ST 123 corresponds to step ST 206, step ST 124 corresponds to step ST 207 and ST 125 corresponds to step ST 208. Here, steps ST 201, ST 203, ST 204 and ST 205, different from steps in FIG. 6, will be explained.

In step ST 201 of FIG. 10, the system controller 2 determines the discharge current value of the storage battery 12 on the basis of the previously obtained predictions of the generated power and the load power on the prediction day. In the photovoltaic power generation system 100 according to Embodiment 2 of the present invention, it is predicted that the power storage device 11 needs to discharge, in the first segment 61 (time t1 to t2), 1.93 kWh at a constant current during the discharge in the power storage device 11. Because the discharge voltage in the power storage device 11 is 100 [V], the system controller 2 determines the current value to be a constant value of 8.27 [A].

In step ST 203, the system controller 2 compares the generated power and the load power obtained in step ST 202. When the value of the load power subtracted by the generated power is larger than the output of the storage battery 12, the process proceeds to step ST 204; when smaller, to step ST 205.

In step ST 204, the system controller 2 makes the storage battery 12 discharge at a constant current to cover the load power required for the load 51. Since the storage battery 12 discharges at a constant value (827 W in Embodiment 2 of the present invention), when the value of the load power subtracted by the generated power is larger than the discharged power of the storage battery 12, the shortage is covered by purchasing power from the system power supply 50.

In step ST 205, because the discharged power of the storage battery 12 is in excess of the value obtained by subtracting the generated power from the load power, the system controller 2 makes the resistor provided in the power conditioner 13 for the storage battery consume the excess amount. Thus, by discharging the storage battery 12 at a constant value, the system controller 2 can charge the storage battery 12 with the entire surplus power in the time t2 to t3.

As described above, according to the storage-battery control device 1 in Embodiment 2 of the present invention, the system controller 2 is characterized in that the storage battery 12 is discharged at a constant current in the first segment 61.

By adopting such operation in which the storage battery 12 is discharged at a constant current, the storage battery 12 is not affected by abrupt changes in the generated power or the load power, thereby suppressing deterioration of the storage battery 12 to lengthen the lifetime thereof.

Note that, in the photovoltaic power generation system 100 according to Embodiment 2 of the present invention, when the power to be discharged from the storage battery 12 is in excess of the value obtained by subtracting the generated power from the load power in the time t1 to t2, the excess amount is consumed by the resistor provided in the power conditioner 13 for the storage battery. Alternatively, the discharge of the storage battery 12 may be stopped in the time t1 to t2 and resumed in the time t2 to t3 for discharging the excess amount of the power.

Embodiment 3

A photovoltaic power generation system 100 according to Embodiment 3 of the present invention will be described using FIG. 11. In Embodiment 3 of the present invention, another variation of a charge/discharge method of the storage battery 12 in the time t1 to t3 will be explained. Explanation below will be focusing on the points different from Embodiment 1, and explanation on the same or the equivalent portion will be omitted when appropriate.

Figure 11:
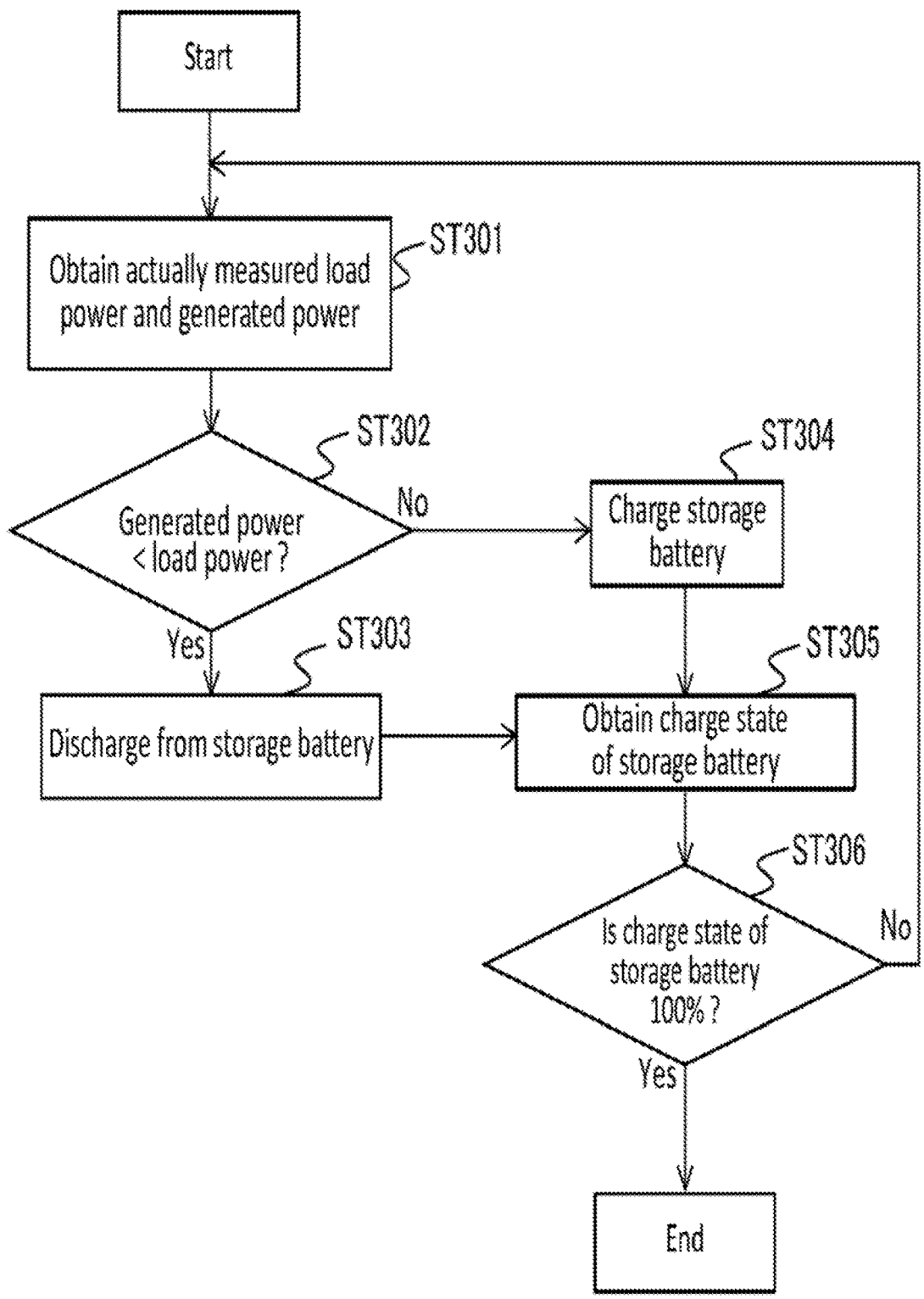
FIG. 11 is a flowchart describing operation of a system controller according to Embodiment 3 of the present invention during a prediction segment (time t1 to t3).

FIG. 11 is a flowchart describing operation of a system controller 2 according to Embodiment 3 of the present invention in the prediction segment 60 (time t1 to t3). In the photovoltaic power generation system 100 according to Embodiment 3 of the present invention, instead of the flowcharts of the system controller 2 shown in FIG. 6 and FIG. 7 in Embodiment 1 of the present invention, a flowchart shown in FIG. 11 is executed. The flowchart shown in FIG. 11 starts at the time t1.

In step ST 301, the system controller 2 obtains the actual measurement values of the generated power by photovoltaic power generation via the BMU 14 of the power storage device 11 and the load power required for the load 51 via the BMU 14 of the power storage device 11.

In step ST 302, the system controller 2 compares the generated power amount with the load power amount. When the system controller 2 determines that the generated power is smaller than the load power, the process proceeds to step ST 303, and when the system controller 2 determines that the generated power is equal to or larger than the load power, the process proceeds to step ST 304.

In step ST 303, the system controller 2 discharges the storage battery 12 to cover the shortage because the generated power itself cannot cover the load power. Then, the process proceeds to step ST 305.

In step ST304, the system controller 2 charges the storage battery 12 with the surplus power obtained by subtracting the load power from the generated power. Then, the process proceeds to step ST 305.

In step ST305, the system controller 2 obtains the charge state of the storage battery 12 which has changed owing to discharging or charging.

In step ST306, the system controller 2 determines whether the charge state of the storage battery 12 is the full charge state. When the system controller 2 determines that the charge state of the storage battery 12 is the full charge state (SOC=100%), the execution of the flowchart ends. On the other hand, when the system controller 2 determines that the charge state of the storage battery 12 is not the full charge state (SOC=100%), the process proceeds to step ST 301. Further, the execution of the flowchart may be ended and the storage battery 12 may be charged using the system power supply when the storage battery 12 determines that the charge state is equal to or less than the predetermined charge state.

With such an operational configuration, even if an error in the prediction of the time t1 or the time t2 predicted by the system controller 2, or an error in the prediction of the generated power or the load power is unusually large due to some failure, etc., the storage battery 12 can be charged or discharged properly. The flowchart in FIG. 11 is applicable also to any other part than the prediction segment 60 (time t1 to t3).

Note that within the scope of the present invention, each embodiment can be freely combined with another, properly modified, or appropriately omitted.

DESCRIPTION OF SYMBOLS

1: storage-battery control device
2: system controller
3: PV-power prediction device
4: load-power prediction device
5: learning device
10: storage-battery charge/discharge system
11: power storage device
12: storage battery
13: power conditioner for a storage battery
50: system power supply
51: load
100: photovoltaic power generation system
101: photovoltaic power generation device
102: solar panel
103: power conditioner for PV

The invention claimed is:

1. A storage-battery control device comprising:
a load-power prediction device to predict load power required for a load;
a PV-power prediction device to predict generated power by photovoltaic power generation; and
a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery at the start point to be a full charge state by charging the storage battery,
wherein an end point of the prediction segment is a time at which the generated power by photovoltaic power generation is predicted to become equal to the load power after reaching a maximum value of the generated power.

2. A storage-battery control device comprising:
a load-power prediction device to predict load power required for a load;
a PV-power prediction device to predict generated power by photovoltaic power generation; and
a system controller to obtain a predicted charge amount that is calculated by subtracting the generated power amount being a summation of the generated power in a prediction segment having a start point set at a predetermined time, from the load power amount being a summation of the load power in the prediction segment, and when the predicted charge amount is positive, to control a charge state of a storage battery at the start point so that the predicted charge amount can be charged in the prediction segment, and when the predicted charge amount is negative or zero, to control the charge state of the storage battery by the start point to be close to a full charge state by charging the storage battery,
wherein an end point of the prediction segment is a time at which the generated power by photovoltaic power generation is predicted to become equal to the load power after reaching a maximum value of the generated power.

3. The storage-battery control device according to claim 1, wherein, during the prediction segment, the system controller discharges the storage battery in a first segment in which the generated power is predicted to increase from the start point and become equal to the load power at its end point, and the system controller charges the storage battery with all of surplus power which is calculated by subtracting the load power from the generated power in a second segment from the end point of the first segment to a time at which the generated power is predicted to decrease and become equal to the load power.

4. The storage-battery control device according to claim 2, wherein, during the prediction segment, the system controller discharges the storage battery in a first segment in which the generated power is predicted to increase from the start point and become equal to the load power at its end point, and the system controller charges the storage battery with all of surplus power which is calculated by subtracting the load power from the generated power in a second segment from the end point of the first segment to a time at which the generated power is predicted to decrease and become equal to the load power.

5. The storage-battery control device according to claim 1, wherein the PV-power prediction device adopts a maximum value, from among generated power amounts predicted from weather information, as a predicted value of the generated power amount by the photovoltaic power generation in the prediction segment.

6. The storage-battery control device according to claim 2, wherein the PV-power prediction device adopts a maximum value, from among generated power amounts predicted from weather information, as a predicted value of the generated power amount by the photovoltaic power generation in the prediction segment.

7. The storage-battery control device according claim 1, wherein the load-power prediction device adopts a minimum value, from among load power amounts predicted from a date and time or a day of week, as the predicted value of the load power amount in the prediction segment.

8. The storage-battery control device according claim 2, wherein the load-power prediction device adopts a minimum value, from among load power amounts predicted from a date and time or a day of week, as the predicted value of the load power amount in the prediction segment.

9. The storage-battery control device according to claim 7, further comprising a learning device to correct, by using actually measured load power, a load pattern corresponding to the date and time or the day of week held in the load-power prediction device.

10. A storage-battery charge/discharge system comprising:
the storage-battery control device according to claim 1; and
a power storage device including the storage battery and a power conditioner for the storage battery to convert power to DC power or AC power in charging and discharging the storage battery.

11. A storage-battery charge/discharge system comprising:
the storage-battery control device according to claim 2; and
a power storage device including the storage battery and a power conditioner for the storage battery to convert power to DC power or AC power in charging and discharging the storage battery.

12. A photovoltaic power generation system comprising:
the storage-battery charge/discharge system according to claim 10, and
a photovoltaic power generation device including a solar panel being a panel to perform the photovoltaic power generation and a power conditioner for PV to convert power generated by the solar panel from DC power to AC power.

13. A storage-battery control method comprising:
predicting load power required for a load in a load-power prediction device;
predicting generated power by photovoltaic power generation in a PV-power prediction device; and
obtaining in a system controller a predicted charge amount that is calculated by subtracting the generated power amount being a summation of the generated power in a prediction segment having a start point set at a predetermined time, from the load power amount being a summation of the load power in the prediction segment, and when the predicted charge amount is positive, controlling a charge state of a storage battery at the start point so that the predicted charge amount can be charged in the prediction segment, and when the predicted charge amount is negative or zero, controlling the charge state of the storage battery at the start point to be a full charge state by charging the storage battery,
wherein an end point of the prediction segment is a time at which the generated power by photovoltaic power generation is predicted to become equal to the load power after reaching a maximum value of the generated power.

14. A storage-battery control method comprising:
predicting load power required for a load in a load-power prediction device;
predicting generated power by photovoltaic power generation in a PV-power prediction device; and
obtaining in a system controller a predicted charge amount that is calculated by subtracting the generated power amount being a summation of the generated power in a prediction segment having a start point set at a predetermined time, from the load power amount being a summation of the load power in the prediction segment, and when the predicted charge amount is positive, controlling a charge state of a storage battery at the start point so that the predicted charge amount can be charged in the prediction segment, and when the predicted charge amount is negative or zero, controlling the charge state of the storage battery by the start point to be close to a full charge state by charging the storage battery,
wherein an end point of the prediction segment is a time at which the generated power by photovoltaic power generation is predicted to become equal to the load power after reaching a maximum value of the generated power.

15. The storage-battery control method according to claim 13, wherein, in the system controller, during the prediction segment, the storage battery is controlled to be discharged in a first segment in which the generated power is predicted to increase from the start point and become equal to the load power at its end point, and the storage battery is controlled to be charged with all of surplus power which is calculated by subtracting the load power from the generated power in a second segment from the end point of the first segment to a time at which the generated power is predicted to decrease and become equal to the load power.

16. The storage-battery control method according to claim 14, wherein, in the system controller, during the prediction segment, the storage battery is controlled to be discharged in a first segment in which the generated power is predicted to increase from the start point and become equal to the load power at its end point, and the storage battery is controlled to be charged with all of surplus power which is calculated by subtracting the load power from the generated power in a second segment from the end point of the first segment to a time at which the generated power is predicted to decrease and become equal to the load power.

17. The storage-battery control method according to claim 13, wherein a maximum value is adopted in the PV-power prediction device, from among generated power amounts predicted from weather information, as a predicted value of the generated power amount by the photovoltaic power generation in the prediction segment.

18. The storage-battery control method according to claim 14, wherein a maximum value is adopted in the PV-power prediction device, from among generated power amounts predicted from weather information, as a predicted value of the generated power amount by the photovoltaic power generation in the prediction segment.

19. The storage-battery control method according to claim 13, wherein a minimum value is adopted in the load-power prediction device, from among load power amounts predicted from a date and time or a day of week, as the predicted value of the load power amount in the prediction segment.

20. The storage-battery control method according to claim 19, wherein a load pattern corresponding to the date and time or the day of week held in the load-power prediction device is corrected in a learning device using actually measured load power.

* * * * *